US009851003B2

(12) United States Patent
Keller

(10) Patent No.: US 9,851,003 B2
(45) Date of Patent: Dec. 26, 2017

(54) REMANUFACTURED SOLENOID VALVES AND DEVICES FOR REMANUFACTURING SOLENOID VALVES

(71) Applicant: Sonnax Industries, Inc., Bellows Falls, VT (US)

(72) Inventor: Patrick A. Keller, Keene, NH (US)

(73) Assignee: Sonnax Industries, Inc., Bellows Falls, VT (US)

(*) Notice: Subject to any disclaimer, the term of this patent is extended or adjusted under 35 U.S.C. 154(b) by 82 days.

(21) Appl. No.: 14/824,459

(22) Filed: Aug. 12, 2015

(65) Prior Publication Data

US 2016/0097449 A1  Apr. 7, 2016

Related U.S. Application Data

(60) Provisional application No. 62/060,113, filed on Oct. 6, 2014.

(51) Int. Cl.
*F16K 31/06* (2006.01)
*F16H 61/02* (2006.01)

(52) U.S. Cl.
CPC ..... *F16H 61/0276* (2013.01); *F16K 31/0634* (2013.01); *F16H 2061/0279* (2013.01)

(58) Field of Classification Search
CPC .... Y10T 137/86622; Y10T 137/87217; G05D 16/2013; F16H 61/0251; F16H 61/0276; F16D 2048/0221; F16K 31/061

USPC ............ 137/15.18, 315.03, 315.09, 315.11, 137/596.17, 625.65
See application file for complete search history.

(56) References Cited

U.S. PATENT DOCUMENTS

| | | | | |
|---|---|---|---|---|
| 4,338,966 A * | 7/1982 | Smith | ................ | F16H 61/0251 137/596.1 |
| 5,356,111 A * | 10/1994 | Bottacini | ............ | F16K 31/0624 137/625.65 |
| 6,719,006 B2 * | 4/2004 | Fleischer | ............... | G05D 16/02 137/596.17 |
| 6,820,650 B2 * | 11/2004 | Solet | ................... | F16K 31/0627 137/315.03 |
| 7,516,756 B2 * | 4/2009 | Mayr | ...................... | F16D 48/02 137/596.17 |
| 8,701,707 B2 * | 4/2014 | Moosmann | ............. | F16D 48/02 137/596.17 |
| 9,157,539 B2 * | 10/2015 | Mayr | ...................... | F16K 17/00 |
| 2014/0196797 A1 * | 7/2014 | Dietel | ..................... | F16K 27/02 137/15.18 |

* cited by examiner

*Primary Examiner* — Reinaldo Sanchez-Medina
(74) *Attorney, Agent, or Firm* — Downs Rachlin Martin PLLC

(57) ABSTRACT

Systems and methods for remanufacturing solenoid valves that enable the repair, reassembly, and reuse of a solenoid are disclosed which may allow for a solenoid valve to be restored to proper working condition and avoid the need to completely replace a malfunctioning solenoid valve. Embodiments may also include solenoid remanufacturing kits that may include a brace for securing a valve housing of a remanufactured solenoid that has been opened for repair.

21 Claims, 13 Drawing Sheets

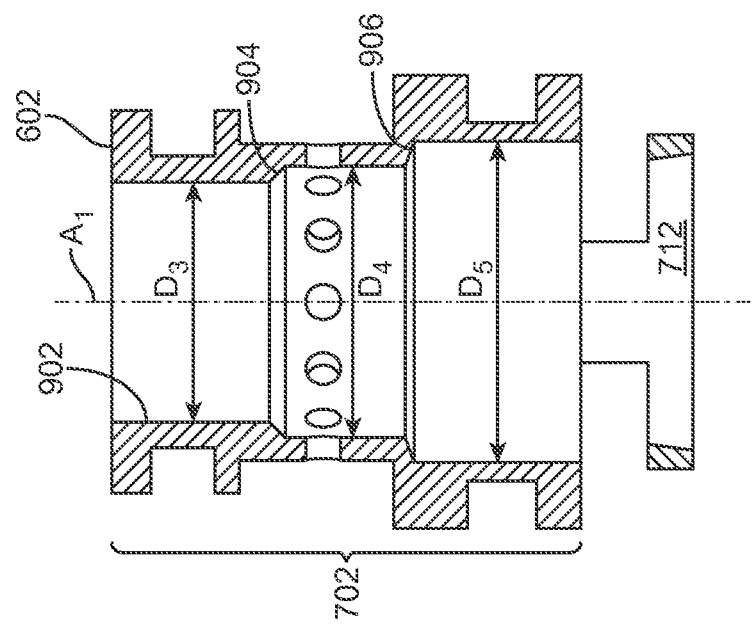
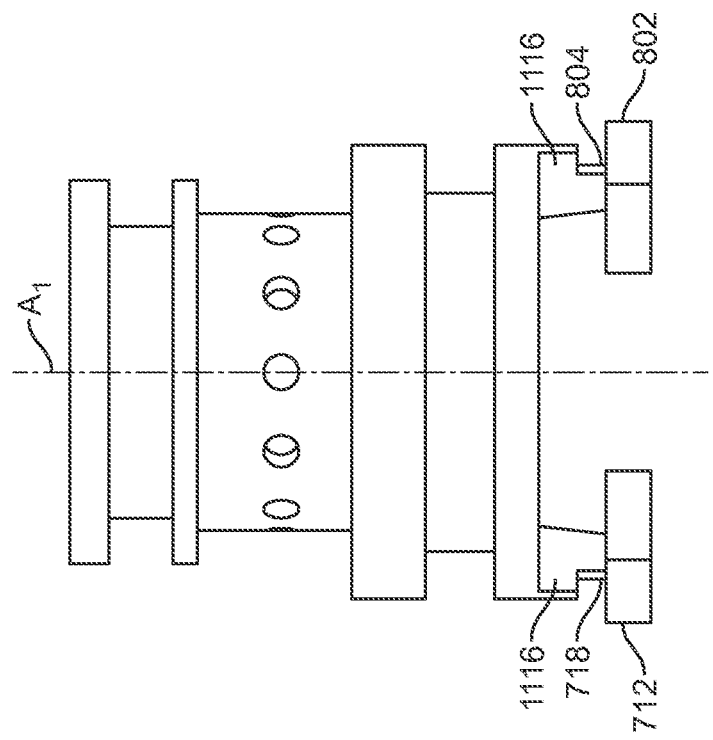

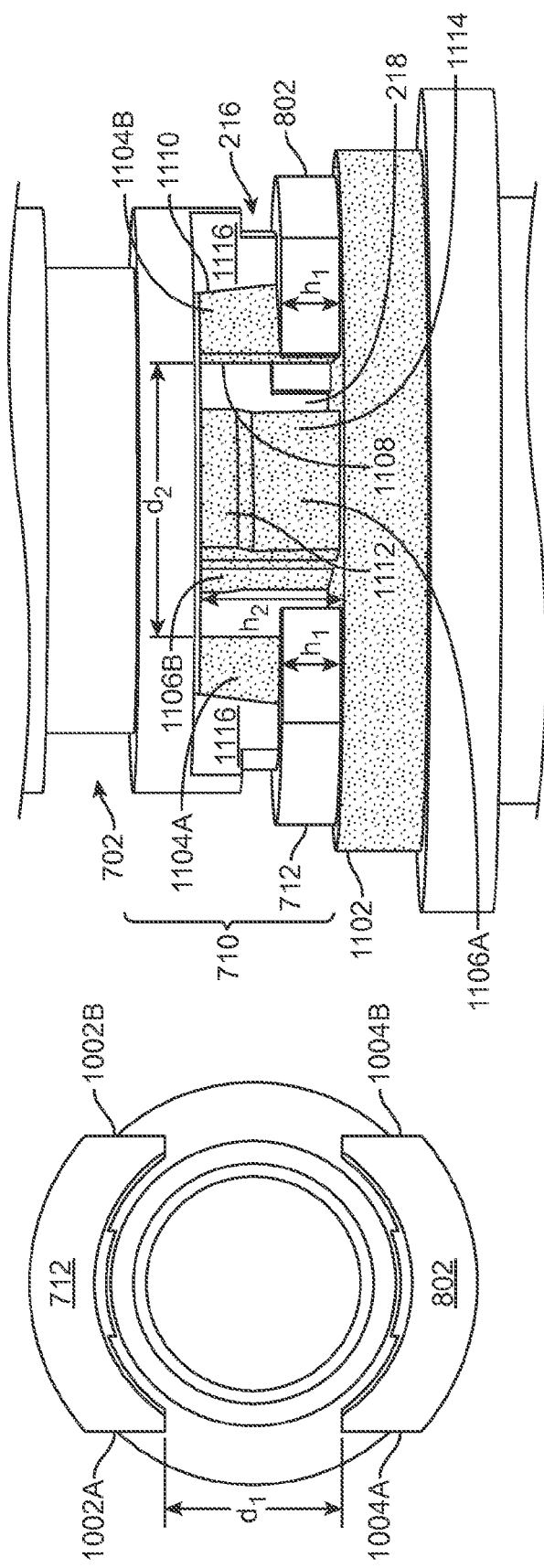

REMANUFACTURED SOLENOID VALVES AND DEVICES FOR REMANUFACTURING SOLENOID VALVES

RELATED APPLICATION DATA

This application claims the benefit of priority of U.S. Provisional Patent Application Ser. No. 62/060,113, filed Oct. 6, 2014, and titled "Methods and Devices for Remanufacturing Solenoids," which is incorporated by reference herein in its entirety.

FIELD OF THE INVENTION

The present invention generally relates to the field of solenoid valves. In particular, the present invention is directed to remanufactured solenoid valves and devices for remanufacturing solenoid valves.

BACKGROUND

Solenoid valves are electromechanically-operated valves that include at least one valve controlled by an electric current through a solenoid. Solenoid valves are ubiquitous in modern automobile transmissions and play critical roles in the proper functioning of the transmission. After prolonged use, however, the valve components in a solenoid valve may begin to wear, which can lead to fluid leakage, causing transmission components to not receive the correct amount of fluid flow and fluid pressure. Depending on the particular solenoid and the severity of the leakage, a malfunctioning solenoid can cause the transmission system to produce error codes, cause poor shift performance, cause the transmission to shift at incorrect times, or not shift at all. In some cases, it might be possible to repair a malfunctioning solenoid by refurbishing or replacing worn or malfunctioning components, however, solenoids are often encased in permanently-sealed housings making it difficult to perform the repair in a manner that allows reassembly and reuse of the solenoid. Thus, the only solution currently available for repairing a transmission with certain types of malfunctioning solenoids is to completely replace the solenoids rather than repair them.

SUMMARY OF THE DISCLOSURE

In one implementation, the present disclosure is directed to a brace for remanufacturing an original equipment (OE) solenoid valve, the OE solenoid valve having a solenoid portion and a valve portion, the valve portion configured and dimensioned to be sealingly disposed in a solenoid bore of a valve body, the valve portion including a valve housing having a substantially cylindrical outer surface, an exhaust portion defining a plurality of exhaust ports, and a substantially cylindrical cap defining a plurality of inlet ports and disposed over the valve housing. The brace includes a first portion having a central longitudinal axis and configured to be disposed on the outer surface of the valve housing and configured to prevent relative movement between the brace and the valve housing in a first direction along the central longitudinal axis; and a second portion configured to be coupled to at least one of the exhaust ports and configured to prevent relative movement between the brace and the solenoid portion in a second direction substantially opposite the first direction to thereby securely couple the valve housing to the exhaust portion.

In another implementation, the present disclosure is directed to a remanufactured solenoid valve that includes a valve moveably coupled to a valve seat; an exhaust portion having a base and a plurality of vertical members defining a plurality of exhaust ports; a valve housing disposed over the valve seat and coupled to the exhaust portion, the valve housing having a fracture line at a location where a portion of the valve housing has been broken open; and a substantially cylindrical brace disposed over the valve housing and coupled to the exhaust portion, the brace configured to secure the valve housing to the exhaust portion.

In still another implementation, the present disclosure is directed to a kit for remanufacturing an Original Equipment (OE) solenoid valve, the OE solenoid valve having a valve housing and a plurality of fluid ports including at least one exhaust port, the valve housing having a fracture line at a location where a portion of the valve housing was opened to repair the OE solenoid valve. The kit includes a substantially cylindrical brace including a first portion configured to be disposed on an outer surface of the valve housing and a second portion including at least one flange; and at least one clip configured to be inserted between the at least one flange and the first portion of the brace and extend into the at least one exhaust port when the brace is slidably disposed over the valve housing to thereby couple the valve housing to the OE solenoid valve.

In yet another implementation, the present disclosure is directed to a method of remanufacturing an original equipment (OE) solenoid valve having valve components, a valve cap, a valve housing, and an exhaust portion that includes removing the valve cap; breaking open and separating a portion of the valve housing from the solenoid valve to access the valve components; repairing one or more of the valve components; repositioning the separated portion of the valve housing on the solenoid valve; and installing a brace on the valve housing to secure the valve housing to the solenoid valve.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 8 is another side view of the brace of FIG. 7;

FIG. 9 is a cross-sectional view of the brace of FIGS. 7 and 8;

FIG. 10 is a bottom view of the brace of FIGS. 7-9;

FIG. 11 shows a portion of the brace of FIGS. 7-10 positioned on a solenoid valve;

DETAILED DESCRIPTION

Aspects of the present disclosure are directed to systems and methods for remanufacturing solenoid valves that enable the repair, reassembly, and reuse of a solenoid. Such techniques and systems allow for a solenoid valve to be restored to proper working condition and avoids the need to completely replace the solenoid with what may be an expensive replacement component, thereby reducing costs associated with a transmission repair. Aspects of the present disclosure may also include a kit for remanufacturing a solenoid which may include a brace for securing a valve housing of a remanufactured solenoid that has been opened for repair.

For the purposes of illustrating aspects of the invention, the present disclosure includes exemplary embodiments of methods and devices for remanufacturing solenoids. The present invention, however, is not limited to the specific embodiments disclosed and may be applied to a variety of solenoid valve types and a variety of different repairs that are not specifically disclosed. For example, the present disclosure includes exemplary methods and devices for repairing normally applied ("NA"), also referred to as "blue cap," 6HP solenoids used in ZF (TM) transmissions, including 6HP19, 6HP21, 6HP26, 6HP28, 6HP32, and 6HP34 model solenoids. The devices and methods disclosed herein may also be applied to a variety of other solenoids. For non-limiting example, aspects of the present disclosure may be applied to normally vented (NV) "yellow cap" 6HP solenoids, "orange cap" 6HP solenoids, 8HP and 9HP ZF solenoids and various solenoids used in Ford 6R60 and 6R80 transmissions, among others. Further information on exemplary solenoids that may be remanufactured using the methods and devices disclosed herein are provided in "Technical Service Information, BMW ZF6HP21/28/34—Audi 6HP28, Preliminary Information," (published by Automatic Transmission Services Group (ASTG), © 2013); "The ZF6HP26 Transmission, BMW Preliminary Information," (Technical Services Information, 2007 Seminar Information published by ASTG) and "6R60 Transmission, Theory and Operation," (© 2006, published by Ford Motor Company) each of which is incorporated by reference herein in its entirety.

Figure 1:
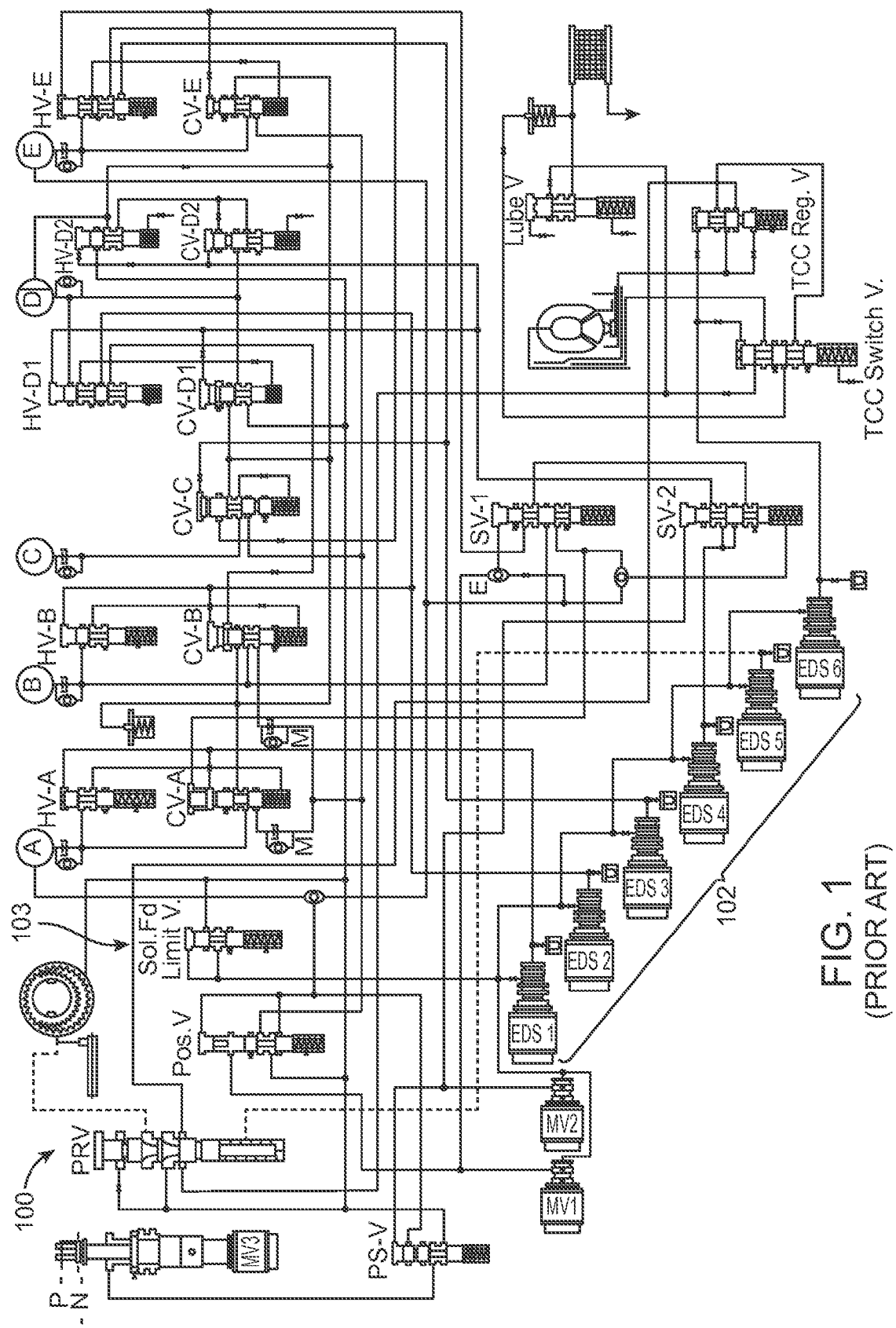
FIG. 1 is a hydraulic schematic of an exemplary prior art Original Equipment (OE) transmission having solenoid valves that may be remanufactured according to the present disclosure.

FIG. 1 shows hydraulic schematic 100 of hydraulic fluid paths in an exemplary ZF (TM) transmission having solenoids that may be remanufactured utilizing the techniques of the present disclosure. For example, aspects of the present disclosure may be used to remanufacture and reinstall any of solenoids EDS 1 through EDS 6, labeled collectively with reference numeral 102, also referred to herein as exemplary Original Equipment (OE) solenoid valves. The term "Original Equipment" and the abbreviation OE, and similar terms, as used herein, refer not only to solenoids and associated parts originally manufactured by a transmission manufacturer or originally sourced by a transmission manufacturer for inclusion in a transmission, but also refers to any aftermarket solenoids or solenoid parts conforming to the OE dimensions and specifications, for example, an aftermarket replacement solenoid for replacing a solenoid originally provided in a transmission. As shown in FIG. 1, in the illustrated ZF (TM) transmission, each of EDS solenoid valves 102 receive fluid from feed limit valve (Sol. Fd. Limit V) 103 and route fluid to their respective downstream valves. For example, EDS 1 routes fluid to Clutch Valve A (CV-A) and Holding Valve A (HV-A). As described more below, during use, the valve components of one or more of EDS solenoid valves 102 may begin to wear, causing leakage and causing an incorrect amount of fluid to be delivered to downstream components, which can lead to transmission malfunction.

Figures 2, 3:
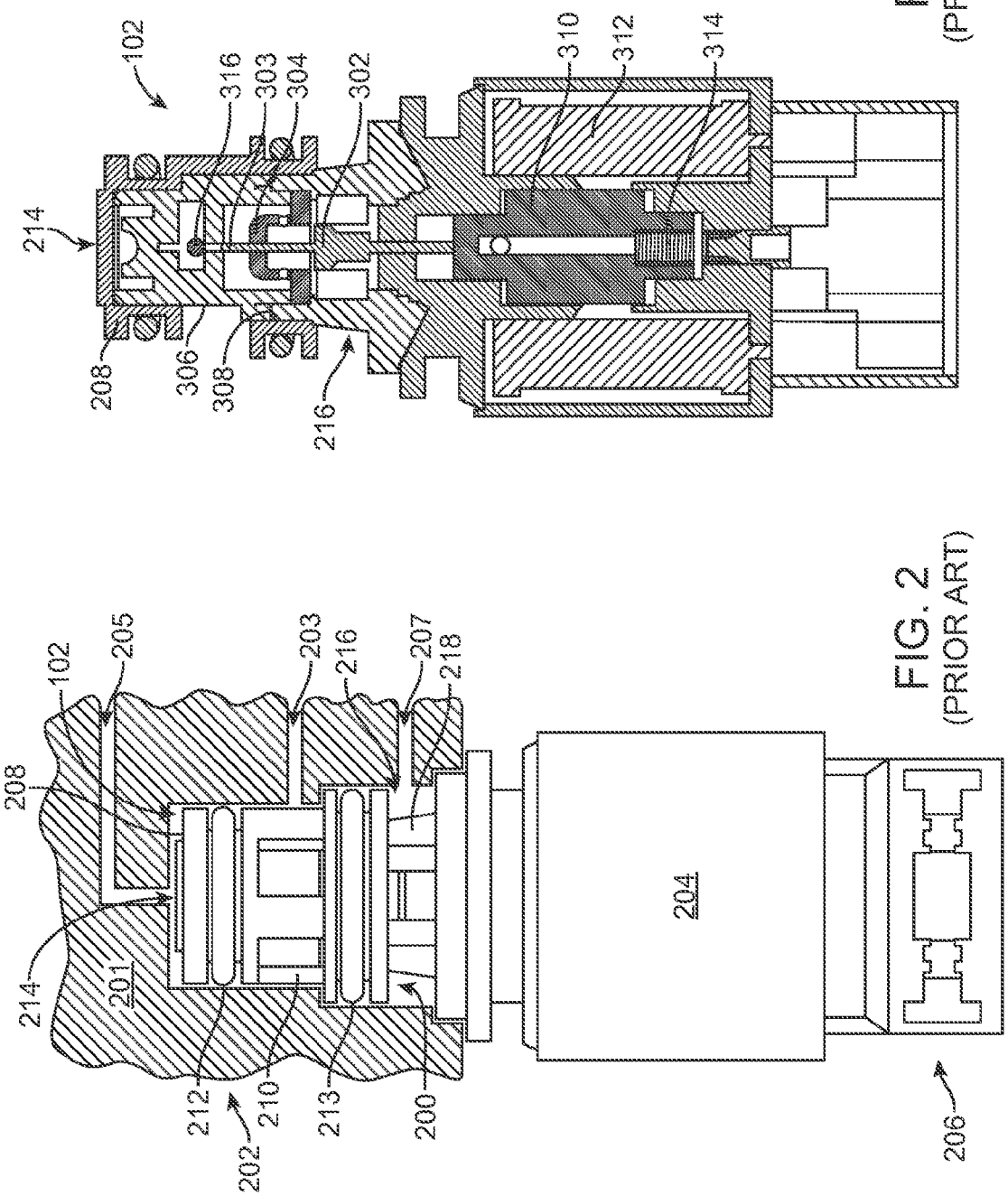
FIG. 2 is a prior art OE solenoid valve from FIG. 1 disposed in a solenoid bore of a valve body.
FIG. 3 is a cross-sectional view of the prior art OE solenoid valve of FIG. 2, the cross section taken along a plane through the center of the valve that is parallel to the plane of the page.

FIGS. 2 and 3 illustrate one of exemplary OE solenoid valves 102. FIG. 2 shows OE solenoid valves 102 disposed in a solenoid bore 200 of a valve body 201. In the illustrated example, OE solenoid valve 102 includes a valve portion 202 configured and dimensioned to be sealingly inserted in the solenoid bore 200 of the valve body 201 and for receiving and routing fluid to one or more fluid outlets, and the OE solenoid includes a solenoid portion 204 and electrical connection 206. Valve portion 202 may include a substantially cylindrical cap 208 defining inlet ports 210 for receiving fluid from a first valve body fluid passageway 203. Cap 208 may include a screen (not illustrated) located over inlet ports 210 for preventing debris from entering the solenoid and two O-rings 212 and 213 for providing a fluid seal when the OE solenoid is installed in bore 200. Valve portion 202 may also include outlet port 214 for fluid communication with a second valve body fluid passageway 205 and exhaust portion 216, the exhaust portion including one or more exhaust ports 218 for fluid communication with a third valve body fluid passageway 207. During use, OE solenoid valve 102 may receive fluid at inlet ports 210 and route the fluid to either outlet port 214 and/or exhaust ports 218, depending on the position of valve 302 (FIG. 3). FIG. 3 is a cross section of OE solenoid valve 102, the cross section taken along a plane through the center of the valve that is parallel to the plane of the page. As shown, solenoid valve 102 may include valve 302 and valve seat 304, encased within exhaust portion 216 and valve housing 306. In the illustrated example, valve housing 306 is permanently attached to exhaust portion 216 at seam 308 such that the valve housing cannot be removed from the exhaust portion without breaking open the valve housing. Solenoid portion 204 may include armature 310, which is configured to controllably adjust the position of valve 302. The position of armature 310 is electromagnetically controlled by a control current passing through electromagnetic coil 312, with the control current being supplied by an external control system such as, for example, a Transmission Control Module (not shown).

FIG. 3 shows armature 310 and valve 302 in an open and retracted position, which may occur when a sufficient amount of current is applied to coil 312 to overcome the force of spring 314 and move the armature away from valve seat 304. With armature 310 retracted, fluid pressure acting on valve 302 can unseat the valve from valve seat 304, allowing fluid to flow past the valve and valve seat to solenoid exhaust ports 218 (FIG. 2), with the amount of fluid flowing to exhaust portion 216 being proportional to the position of the valve. Valve housing 306 may also include check ball 316 which may completely block fluid flow to outlet port 214 when valve 302 is sufficiently retracted so that valve stem 303 is sufficiently lowered and the ball is in a seated position, as shown in FIG. 3. When the current is reduced or turned off, spring 314 forces armature 310 and valve 302 towards valve seat 304, eventually fully closing the valve when the valve is fully seated in the valve seat. With the valve fully closed and valve 302 seated in valve seat 304, all fluid entering inlet ports 210 (FIG. 2) may pass to outlet port 214 and act on downstream components. As is known in the art, other solenoids, such as NV solenoids, may normally be open when no current is being applied and close when current is applied to the solenoid.

As described above, it is common for solenoid valves, such as solenoid valve 102, to begin to malfunction after use for some period of time. One common source of malfunction is excessive wear of one or more of valve 302 and valve seat 304 from repeated opening and closing of the valve. In one example, such wear occurs more often in valve seat 304, which may be due in part to a difference in material properties between the valve and valve seat in some valves, where the valve seat may be manufactured from a softer material, such as brass, while the valve may be made from a harder material, such as steel. Such wear may lead to a faulty seal between valve 302 and valve seat 304, resulting in fluid leakage past valve 302 and valve seat 304 to exhaust ports 218 when the valve is fully closed, which may result in components downstream of OE solenoid valve 102 receiving an improper amount of fluid pressure and flow, which can result in one or more of the various transmission malfunctions described above. In addition to, or instead of, excessive wear in one or both of valve 302 and seat 304, OE solenoid valve 102 may also begin to malfunction for a variety of other reasons, including other mechanical failures or wear to one or more of the components within, for example, valve housing 306 and/or exhaust portion 216.

Figure 5:
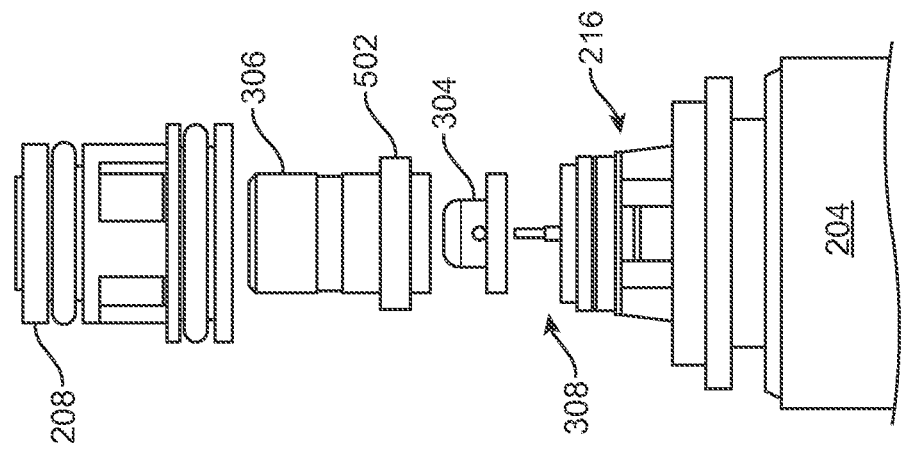
FIG. 5 is an exploded view illustrating disassembly of a solenoid valve according to one embodiment disclosed herein.
Figure 4:
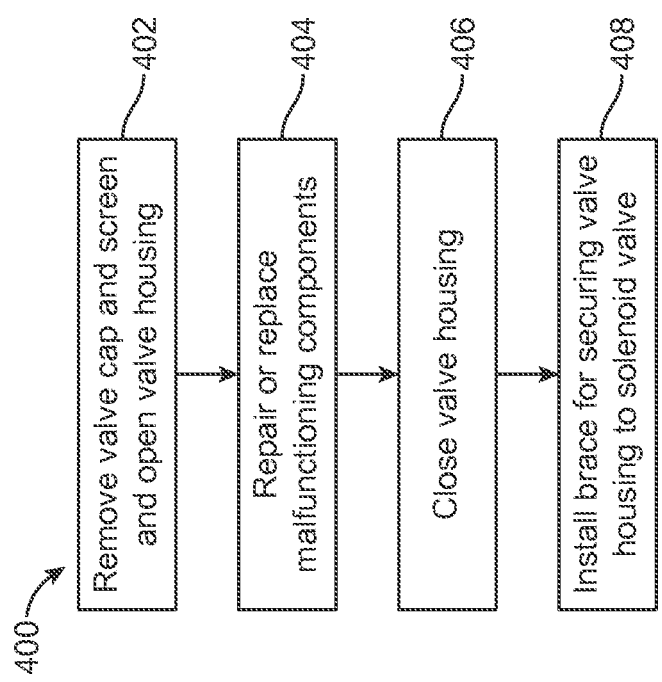
FIG. 4 is a flow chart of an exemplary method of remanufacturing a solenoid valve.

As described above, in the illustrated example, OE valve housing 306 is permanently attached to exhaust portion 216 such that valve components within the housing such as valve 302 and seat 304, cannot be easily accessed in a manner that allows reassembly of the valve for continued use. Thus, when a solenoid valve such as OE solenoid valve 102 begins to malfunction due to, for example, excessive wear in valve seat 304, the entire solenoid valve 102 is often replaced, even though the remaining components of the valve are still properly functioning. FIG. 4 illustrates an exemplary method 400 for remanufacturing a malfunctioning solenoid valve such as OE solenoid valve 102 that allows the repair and continued use of the solenoid. As shown, method 400 may include, at step 402, removing the cap, such as cap 208 (FIG. 2) and associated screen, if any, from the valve, and then opening the valve housing, such as valve housing 306 (FIG. 3) to access the valve components. In one example, as illustrated in FIG. 5, valve housing 306 may be broken open and separated from exhaust portion 216 at a location near seam 308 (see FIGS. 3 and 5) along a fracture line, thereby separating a portion of the valve housing being removed or opened from a remaining portion of the valve housing and/or exhaust portion 216. In the illustrated embodiment, the fracture line is along seam 308. In other embodiments, the fracture line may be located in other portions of valve housing 306 and/or exhaust portion 216. In yet other embodiments, valve housing 306 may be broken open at another location that allows access to valve 302 and valve seat 304. Returning to FIG. 4, at step 404, the valve components, such as, for example, valve 302, valve seat 304, check ball 316, exhaust portion 216, and valve housing 306, may be inspected to determine if one or more of the components need to be repaired or replaced, and if so, to repair or replace as needed. For example, if the inspection reveals that valve seat 304 has excessive wear, the valve seat may be replaced with a replacement valve seat. As described more below, the replacement valve seat may have the same configuration as OE valve seat 304 being replaced, or may have an alternative configuration, and may be made of the same material as the OE seat, or may be made of a more wear-resistant material, such as, for example, stainless steel, or carbon steel. Other components may similarly be repaired or replaced as needed. At step 406, valve housing 306 may be closed by, for example, re-positioning the valve housing on exhaust portion 216 or otherwise replacing and repositioning the portion(s) of the valve housing that were broken open to access the valve components. In some embodiments, an adhesive may be used to aid in the reattachment of housing 306 to exhaust portion 216. At step 408, after re-positioning or otherwise closing housing 306, a brace may be installed for securing the housing to the remainder of the valve to ensure the housing is securely closed and so that the valve may continue to be used with the replacement component(s) installed. As described more below, the present disclosure includes braces and brace assemblies, e.g., brace 602 and brace assembly 600 (FIG. 6) for accomplishing step 408 and includes remanufacturing kits that include such braces for performing such a repair. In some embodiments cap 208 may be discarded and a brace for securing valve housing 306 to exhaust portion 216 may also provide functions previously provided by the cap, for example, providing inlet and outlet ports to replace the function of inlet ports 210 and outlet port 214 (FIG. 2) and having features for receiving screens and O-rings similar to the screen (not illustrated) and O-rings 212, 213 coupled to OE cap 208.

Figure 6:
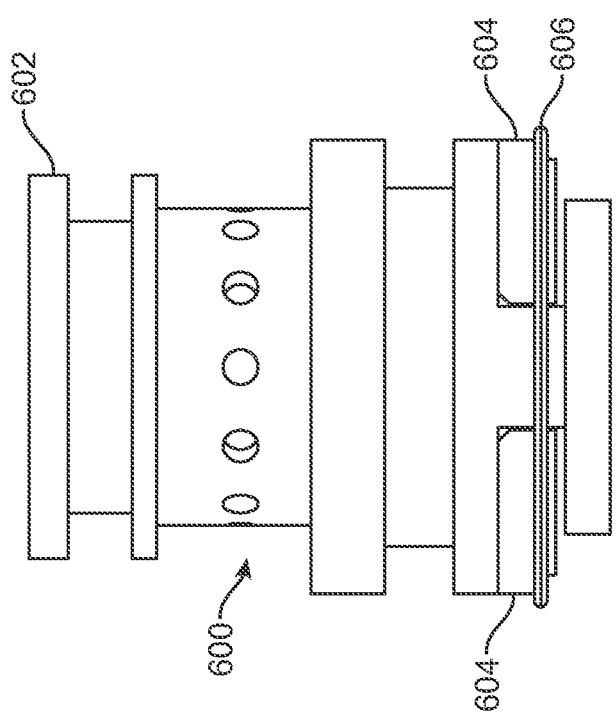
FIG. 6 is a side view of an exemplary brace assembly.

FIG. 6 illustrates an exemplary embodiment of brace assembly 600 for remanufacturing a solenoid valve such as OE solenoid valve 102. In one example, brace assembly 600 may be installed at step 408 of exemplary process 400 (FIG. 4), to securely reattach valve housing 306 to solenoid valve 102 or otherwise securely close the valve housing. Illustrated assembly 600 may include brace 602 which may be configured and dimensioned to be slidably disposed over a valve housing such as valve housing 306 (FIG. 3), and be secured to a valve by, in the illustrated example, a pair of clips 604, and the pair of clips may be secured to brace 602 by snap ring 606 disposed around the brace and clips. As described more below, assembly 600 may provide multiple functions. For example, assembly 600 may replace the functionality of an OE valve cap, such as cap 208 (FIG. 2), such as defining inlet ports, providing a fluid seal for the solenoid valve, and having or receiving a screen for screening debris from entering the valve. Assembly 600 may also serve as a structural brace to securely hold valve housing 306 that has been separated from solenoid valve 102, or otherwise opened, to the valve. The components of brace assembly 600 may be made from a variety of different materials. For example, brace 602 may be made from a metal such as aluminum or plastic. Clips 604 may be made from steel or stainless steel. Snap ring 606 may be made from steel.

Figure 7:
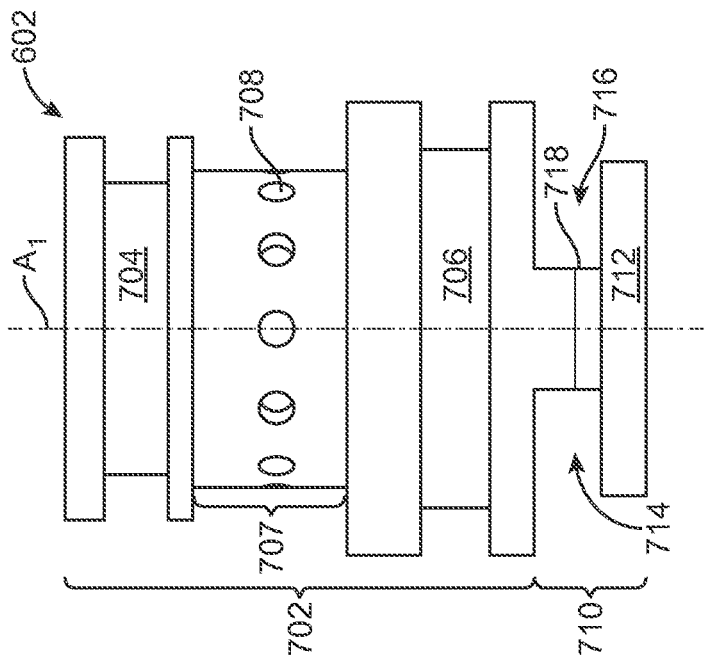
FIG. 7 is a side view of the exemplary brace shown in the assembly of FIG. 6.
Figure 19:
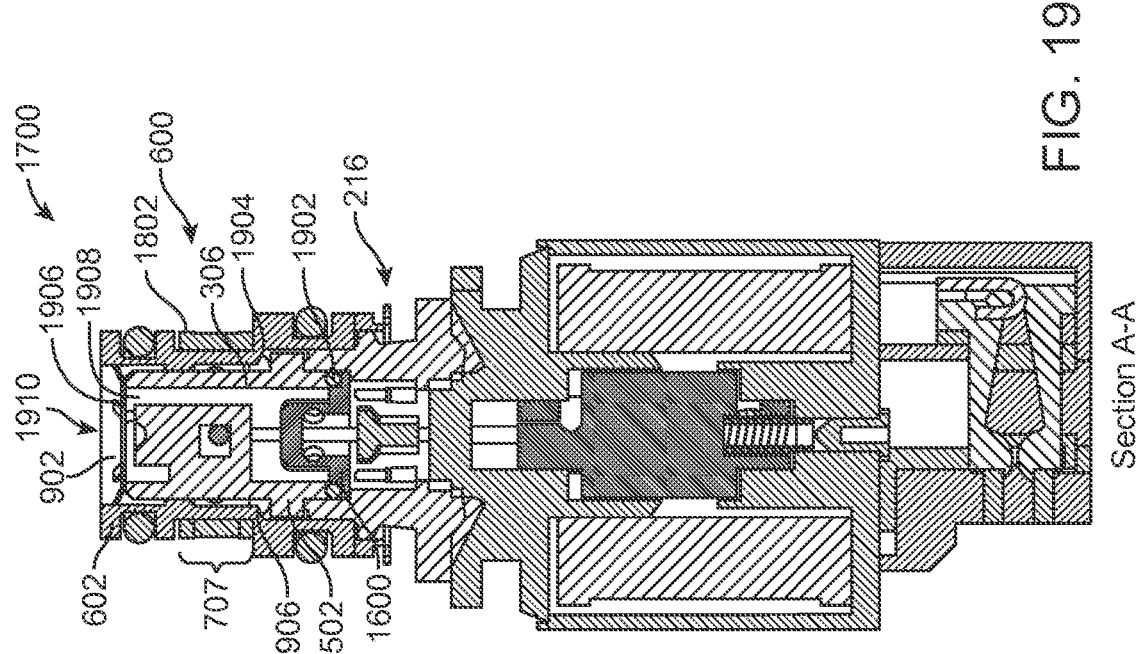
FIG. 19 is a cross-sectional view of the remanufactured solenoid valve of FIGS. 17 and 18 corresponding to section line A-A of FIG. 17.

FIGS. 7-10 illustrate example brace 602 in various orientations, with FIGS. 7, 8, and 10 showing outer views and FIG. 9 showing a cross-sectional view of the brace. As shown in FIG. 7, brace 602 may include first portion 702 which may have a central longitudinal axis A1. In the illustrated example, first portion 702 is substantially cylindrical and is configured to be slidably disposed over a solenoid valve housing, such as valve housing 306. Illustrated brace 602 has an outer surface that may be shaped and dimensioned in a similar fashion as OE valve cap 208 so that brace 602 may perform the functions of the OE cap. Thus, in one embodiment, the outer dimensions of brace 602 may be substantially the same as the valve cap of the solenoid valve the brace is designed for so that a solenoid with the brace installed may be reinstalled in a transmission. Similarly, brace 602 may have first and second O-ring grooves 704, 706 sized for receipt of O-rings for performing the same function as the original O-rings on a remanufactured valve, such as O-rings 212 and 213 (FIG. 2). Brace 602 may have a fluid inlet portion 707 having a plurality of fluid passageways 708 formed around a circumference of the fluid inlet portion that may be configured to perform a function similar to the function of OE inlet ports 210 and allow fluid access to valve housing 306. As shown, exemplary fluid passageways 708 are a plurality of substantially circular openings formed around a circumference of first portion 702 and formed in a plane substantially perpendicular to central longitudinal axis A1. Such an arrangement may facilitate ease of manufacture. In alternative embodiments, other shapes and orientations of fluid passageways may be used. As shown in FIG. 9, brace 602 may have a stepped inner wall 902 including a first diameter D3, a second diameter D4 that is greater than D3, and a third diameter D5 that is greater than D4. Inner wall 902 may also include a first radially-extending ledge 904 between diameters D3 and D4 and a second radially-extending ledge 906 between diameters D4 and D5. Diameter D3 may be sized and configured for a sliding interference fit or otherwise slidable coupling with OE valve housing 306, and ledge 906 may be configured to come into contact with an O-ring disposed on ledge 502 of OE housing 306 (FIGS. 5, 19). Thus, one or more of first diameter D3 and ledge 904 may be configured to prevent relative movement between OE valve housing 306 and brace 602 in a first direction along central longitudinal axis A1 when the brace is slidably disposed over the housing. As described below in connection with FIG. 19, a lock washer may also be installed in brace 602 to prevent relative movement in the first direction.

Brace 602 may also include second portion 710 configured to be coupled to a fluid port of a solenoid valve. In the illustrated example, second portion 710 may be configured to be coupled to exhaust portion 216 of solenoid valve 102. Second portion 710 may have a maximum outer diameter that is less than or equal to a maximum outer diameter of exhaust portion 216, and may have a minimum inner diameter that is greater than a minimum inner diameter of the exhaust portion. As best seen in FIGS. 7-10, exemplary second portion 710 may include two flanges 712, 802, that may be spaced in a direction parallel to central longitudinal axis A1 from first portion 702. As shown in FIG. 6, flanges 712 and 802 may be configured to receive clips 604 positioned in spaces 714, 716 (FIG. 7) between flanges 712, 802 and first portion 702 for coupling brace 602 to solenoid valve 102. Second portion 710 may also include snap ring grooves 718 and 804 (FIGS. 7 and 8) dimensioned and located for receipt of snap ring 606 installed around second portion 710 for securing clips 604 to the second portion.

Exemplary flanges 712 and 802 may be substantially horizontal and may be located in a plane that is substantially perpendicular to central longitudinal axis A1. Flanges 712 and 802 may be arcuate and may have an outer radius and curvature that approximates an outer radius and curvature of base 1102 of exhaust portion 216 (FIG. 11). In other embodiments, flanges 712 and 802 may have other shapes, including rectangular, or having a curvature that does not approximate the curvature of the exhaust portion. As best seen in FIGS. 10 and 11, in the illustrated embodiment, flanges 712 and 802 may be spaced from first portion 702 such that the flanges 712 and 802 are proximate base 1102 (FIG. 11) of exhaust portion 216 and may be spaced a sufficient distance from the first portion to allow insertion of clips 604. As shown in FIG. 11, in one embodiment, flanges 712 and 802 may have a height h1 that is approximately half of a height h2 of exhaust ports 218.

As shown in FIGS. 11 and 17-19, brace 602 may be designed and configured for use with solenoid valve 102. As best seen in FIG. 11, solenoid valve 102 may include exhaust portion 216 having four exhaust ports 218 defined by a first pair of vertical members 1104A and 1104B located on opposite sides of exhaust portion 216 and second pair of vertical members 1106A and 1106B also located on opposite sides of the exhaust portion and spaced circumferentially from the first pair of vertical members by approximately 90 degrees. First pair of vertical members 1104A, 1104B have a tapered profile with a substantially vertical inner wall 1108 (only one labeled) and an angled and substantially linear outer wall 1110 (only one labeled). Second pair of vertical members 1106A, 1106B have a stepped profile with a substantially vertical inner wall similar to inner walls 1108, and a stepped outer wall, including protrusion 1112 on an upper portion of the outer wall that stands proud of tapered lower section 1114. Exemplary horizontal flanges 712 and 802 of second portion 710 may be located on substantially opposite sides of brace 602 so that each of flanges 712 and 802 may be positioned adjacent first pair of vertical members 1104A and 1104B. Exemplary second portion 710 of brace 602 may also include connector members 1116 extending between first portion 702 and respective second portion horizontal flanges 712, 802. Illustrated connector members 1116 may have inner surfaces having a complementary shape to outer wall 1110 of vertical members 1104A and 1104B of solenoid valve 102, which, as described above, in the illustrated example, is an angled or tapered substantially linear contour. As best seen in FIG. 10, flange 712 may also have first and second ends 1002A and 1002B and flange 802 may have first and second ends 1004A and 1004B. First ends 1002A and 1004A may be spaced by a distance d1, and second ends 1002A and 1002B may be similarly spaced by a distance d1, which may provide for an adequate cross-sectional flow area for fluid flow through exhaust portion 216 when brace assembly 600 is installed on solenoid valve 102. In one embodiment, d1 may be substantially the same as linear distance d2 (FIG. 11) between inner walls 1108 of vertical members 1104A and 1104B.

Figure 12:
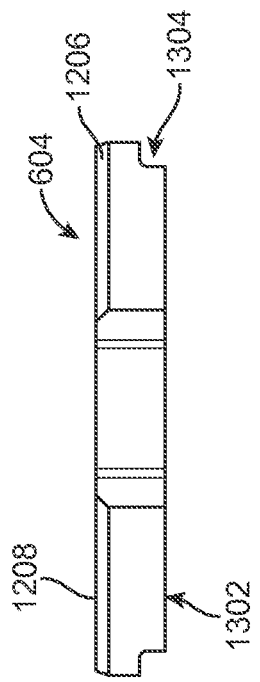
FIG. 12 is a top view of an exemplary clip.
Figure 13:
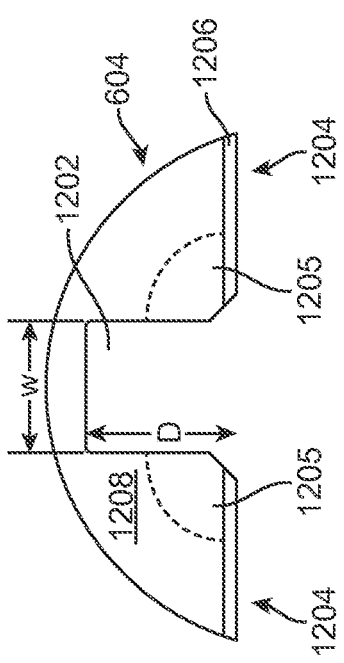
FIG. 13 is a side view of the clip of FIG. 12.
Figure 14:
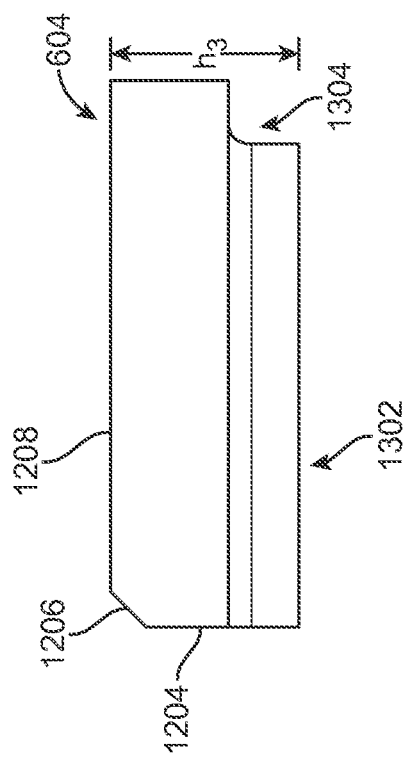
FIG. 14 is another side view of the clip of FIGS. 12 and 13.

FIGS. 12-14 illustrate an exemplary embodiment of clip 604 for use with assembly 600. As shown, clip 604 may have a maximum height h3 that may be slightly less than the difference between height h2 of exhaust ports 218 and height h1 of horizontal flanges 712 and 802 (FIG. 11) such that the clip is designed and configured to be slidably inserted into the space between the horizontal flanges and an upper surface of the exhaust ports. Clip 604 may also have a notch 1202 that, in the illustrated embodiment, is centrally-located on the clip, and that has a complementary shape to the outer dimensions of protrusion 1112 of vertical members 1106A and 1106B and may be sized and configured with a sufficient width W so that the clip may be slid over protrusion 1112 of one of vertical members 1106A, and a sufficient depth D so that faces 1204 may come into contact with connector members 1116 of lower portion 710 of brace 602. Such an arrangement provides a secure and non-rotating coupling of assembly 600 to solenoid valve 102, where the size and shape of notch 1202 ensures clip 604 will not rotate relative to vertical members 1106A or 1106B when disposed thereon, and the contact of faces 1204 against connector members 1116 of brace 602 ensures the brace will also not rotate with respect to the valve when a pair of clips are inserted on opposite sides of the brace. Such non-rotating coupling features can ensure proper alignment of assembly 600 with solenoid valve 102 and exhaust ports 218. In other embodiments, second portion 710 may have a variety of other configurations. For non-limiting example, flanges 712 and 802 may be configured for placement adjacent second pair of vertical members 1106A and B, and clips 604 may be configured for insertion over first pair of vertical members 1104A and B. In yet other embodiments, assembly 600 may include alternative clip members that may be configured to couple brace 602 to OE solenoid valve 102 in other ways, for example, the brace assembly may include a single clip configured to couple the brace to the OE valve.

As described and illustrated above, exemplary assembly 600 may include a pair of clips 604 inserted on opposite sides of brace 602. When so inserted, inner portions 1205 (FIG. 12) of upper surface 1208 of clip 604 may come into contact with upper surfaces of adjacent exhaust ports 218, (the dotted line in FIG. 12 illustrating the approximate location of an outer radius of the upper wall of the exhaust ports when the clip is fully inserted). Also, when clip 604 is inserted, lower surface 1302 (FIG. 13) of the clip is configured to be in contact with an upper surface of horizontal flanges 712 and 802. Thus, when a pair of clips 604 are inserted on opposite sides of brace 602, (as shown, e.g., in FIG. 17), the clips, via contact with the upper surface of the horizontal flanges and the contact of inner portions 1205 with an upper surface of adjacent exhaust ports, provides a coupling that prevents assembly 600 from moving away from exhaust portion 216 in a direction substantially parallel to central longitudinal axis A1. Thus, second portion 710 may be coupled to exhaust portion 216 to prevent such relative movement. Faces 1204 of exemplary clip 604 may also have a tapered edge 1206 that can facilitate ease of installation. Clip 604 may also have snap ring groove 1304 (FIGS. 14 and 15) that may be sized and configured for receipt of snap ring 606 (FIGS. 6, 15) and may be located so that a single snap ring 606 may be used to secure a pair of clips 604 to brace 602. In the illustrated example, groove 1304 is formed in lower surface 1302 of clip 604 while snap ring grooves 718 and 804 (FIG. 8) are located in connector members 1116 above flanges 712 and 802.

Figure 16:
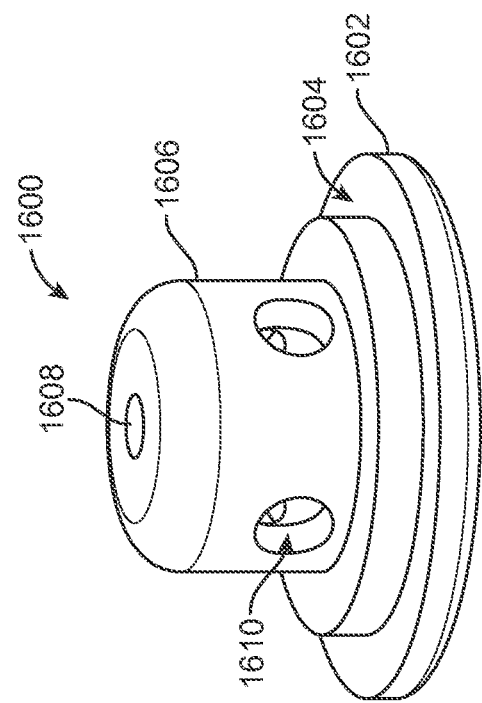
FIG. 16 shows an exemplary replacement valve seat.
Figure 15:
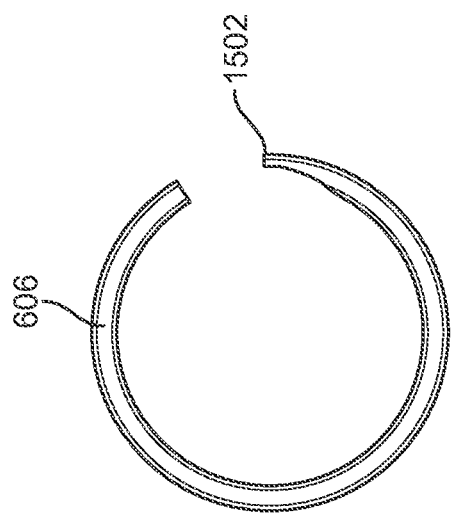
FIG. 15 shows an exemplary snap ring.

FIG. 15 illustrates exemplary snap ring 606, which may be configured and dimensioned to be positioned around clips 604 and brace 602 in snap ring grooves 1304 of the clips and grooves 718 and 804 of the brace, to thereby securely couple the clips to the brace and securely couple assembly 600 to a valve. Illustrated clip 606 may include tapered end 1502 which may facilitate ease of installation and removal. FIG. 16 illustrates exemplary replacement valve seat 1600, which may be used to replace a worn OE valve seat, such as OE valve seat 304 (FIG. 3). Replacement valve seat 1600 may include base 1602 having an outer diameter that is less than or equal to, and in some embodiments, substantially the same as, an outer diameter of a OE valve seat being replaced. Seat 1600 may also include recess 1604 in base 1602 that may be sized and configured for receipt of an O-ring for providing an improved fluid seal between the replacement valve seat and a valve housing such as valve housing 306 (FIG. 3). Replacement seat 1600 may also include upper portion 1606 that may be configured to perform the same functions as an upper portion of an OE valve seat being replaced and may include valve stem opening 1608 to allow passage of a valve stem through the opening such as valve stem 303 (FIG. 3), and may include a plurality of fluid openings 1610 (only one labeled), for passage of fluid flow through the replacement seat when the valve is opened.

Figure 17:
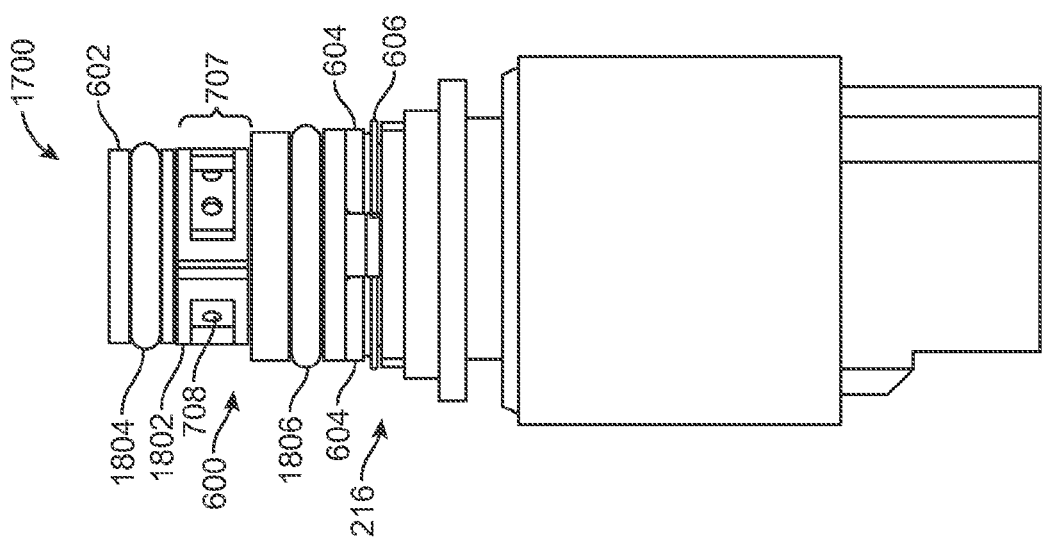
FIG. 17 is a side view of an exemplary remanufactured solenoid valve.
Figure 18:
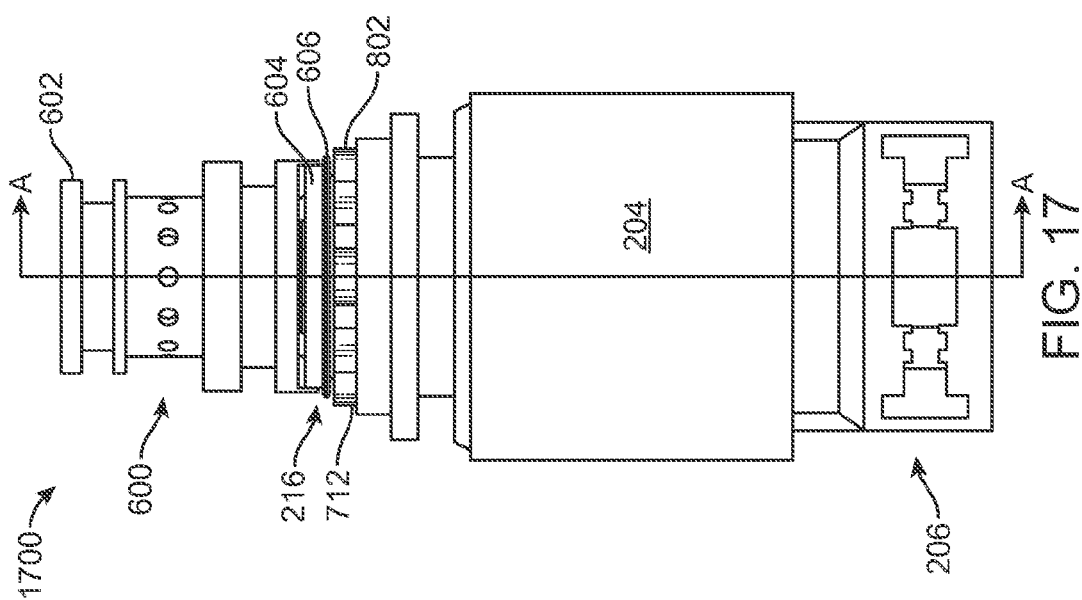
FIG. 18 is another side view of the remanufactured solenoid valve of FIG. 17, rotated 90 degrees.
Figure 21:
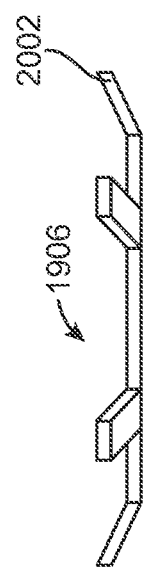
FIG. 21 is a side view of the lock washer of FIG. 20.
Figure 20:
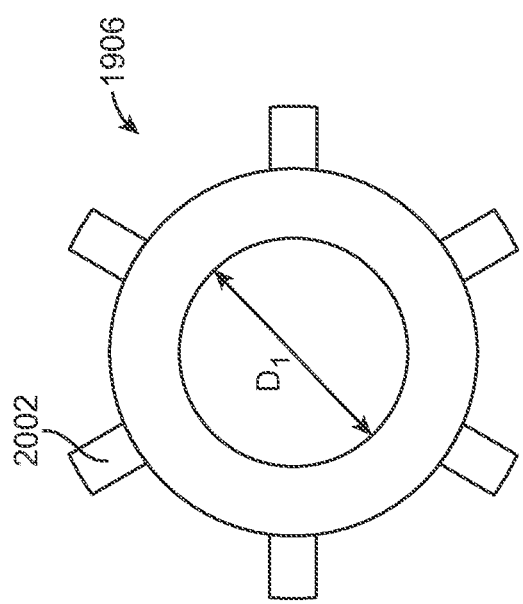
FIG. 20 is a top view of an exemplary lock washer.

FIGS. 17-19 illustrate an exemplary remanufactured solenoid 1700 that includes exemplary assembly 600. Exemplary remanufactured solenoid 1700 may have originally been a malfunctioning OE solenoid such as OE solenoid valve 102 (FIGS. 2 and 3), and may have been remanufactured according to, for example, illustrated process 400 (FIG. 4) to inspect, repair, or replace one or more valve components. As shown, remanufactured solenoid 1700 may include assembly 600 for securing valve housing 306 (FIG. 19) to exhaust portion 216, resulting in a properly functioning remanufactured solenoid that may be installed and used in a vehicle transmission. As shown in FIGS. 18 and 19, remanufactured solenoid 1700 may also include screen frame 1802 which may be configured and dimensioned to be located around fluid inlet portion 707 of brace 602 for supporting a screen (not shown) for preventing debris from entering fluid passageways 708. Remanufactured solenoid 1700 may also include O-rings 1804, 1806 for replacing O-rings 212, 213 (FIG. 2). In some embodiments, O-rings 212, 213 may be reused. As best seen in FIG. 19, a valve seat O-ring 1902 may also be included for providing an improved seal between OE valve housing 306 and replacement valve seat 1600 and may be located in recess 1604 of the valve seat (FIG. 16). Remanufactured solenoid 1700 may also include O-ring 1904, located between OE valve housing 306 and brace 602 for providing a more secure fit between the housing and brace. In the illustrated embodiment, O-ring 1904 is located between second radially extending ledge 906 of brace 602 and ledge 502 of OE valve housing 306. Remanufactured solenoid 1700 may also include a lock washer 1906 (also shown in FIGS. 20 and 21) for providing an additional means of securing brace 602 to OE valve housing 306, which may be inserted into the top of brace 602 and positioned in abutting contact with a top portion of valve housing 306. As best seen in FIGS. 20 and 21, lock washer 1906 may be a countersunk external tooth lock washer with external teeth 2002 (only one labeled) sized and configured for engagement with inner wall 902 of brace 602. Exemplary lock washer 1906 may also have an inner diameter Dl sized and configured to be larger than a fluid opening 1908 in the top of OE valve housing to ensure the lock washer does not block fluid flow through outlet port 1910.

Figure 22:
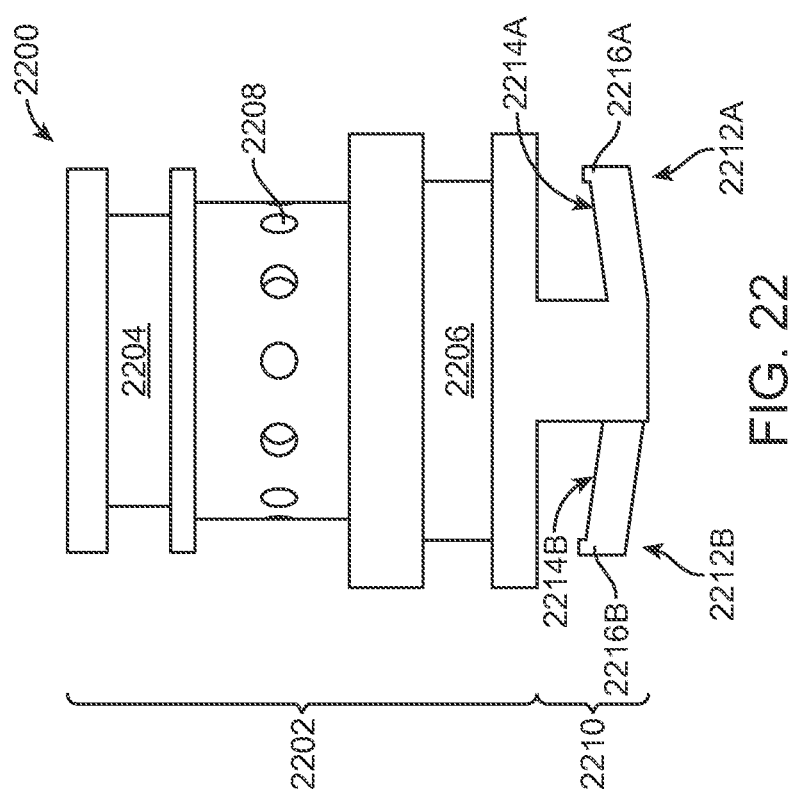
FIG. 22 is a side view of another exemplary embodiment of a brace.
Figure 23:
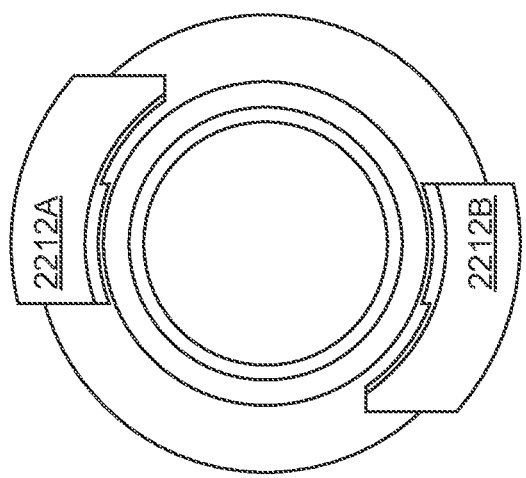
FIG. 23 is a bottom view of the brace of FIG. 22.

FIGS. 22 and 23 illustrate alternative exemplary brace 2200, which may be used instead of brace assembly 600. Illustrated brace 2200 may be designed and configured to remanufacture a malfunctioning solenoid in a similar manner to assembly 600 (FIG. 6) and may be similarly configured to provide the functionality of an OE valve cap that has been removed, such as OE valve cap 208 (FIG. 2) and also serve as a brace for securing a valve housing, such as OE valve housing 306, which has been broken open or otherwise separated from the valve. Unlike assembly 600, brace 2200 may be designed for use without the need for clips, such as clips 604, and may function as a one-piece component for coupling a valve housing to a valve. Illustrated brace 2200 may include first portion 2202 which may be substantially the same as first portion 702 of brace 602 (FIG. 7), and may similarly include O-ring grooves 2204 and 2206, a plurality of fluid passageways 2208 and have outer dimensions that are similar to the outer dimensions of an OE valve cap being replaced so that when coupled to a remanufactured valve, the remanufactured valve may be reinstalled in a transmission. Brace 2200 may also include second portion 2210, which may be configured to couple to an exhaust portion of an OE valve such as exhaust portion 216 using any of a variety of configurations that allow for coupling the second portion to one or more features of the exhaust portion. For example, second portion 2210 may be configured to be moved into a locked position by inserting and/or rotating the brace to engage one or more locking features of the second portion with one or more features of a valve. For non-limiting example, illustrated second portion 2210 may be designed and configured to couple brace 2200 to a valve by sliding the brace over valve housing 306 and then rotating the brace so that angled locking features 2212A and 2212B engage protrusions 1112 of vertical members 1106A and 1106B of exhaust portion 216 (vertical members 1106A and B illustrated in FIG. 11). In the illustrated example, locking features 2212A and 2212B may form recesses 2214A and 2214B that may be sized to receive protrusions 1112 of vertical members 1106A and 1106B. Locking features 2212A and 2212B may each include substantially-vertically-extending-ridge 2216A and 2216B, respectively, or other similarly shaped structure for engaging a side of protrusions 1112 such that when brace 2200 is inserted over OE valve housing 306 and then rotated, it may "click" into place or otherwise engage vertical members 1106A and 1106B to thereby secure the brace to exhaust portion 216. In some embodiments, locking features 2212A and 2212B may be resiliently biased to a locked position. In alternative embodiments, second portions of braces may include other features for coupling the brace to an exhaust portion such as exhaust portion 216, including resiliently biased features that are configured to insert into exhaust ports 218 when the brace is moved vertically over the valve housing and exhaust portion. In yet other embodiments, second portion may have alternative locking features for engaging exhaust portion when the brace is rotated, such as a cam locking feature that tightens the brace into a locked position, including cam features that engage one or more of protrusions 1112 and exhaust ports 218.

Further alternative exemplary embodiments of the present disclosure are described in the paragraphs below.

In one example, a method of remanufacturing an original equipment (OE) solenoid valve having valve components, a valve cap, a valve housing, and an exhaust portion that includes removing the valve cap, breaking open and separating a portion of the valve housing from the solenoid valve to access the valve components, repairing one or more of the valve components, repositioning the separated portion of the valve housing on the solenoid valve, and installing a brace on the valve housing to secure the valve housing to the solenoid valve. Such an exemplary method may also include one or more of the following features:

The valve cap is not reused and the brace replaces the valve cap.

The brace includes a first cylindrical portion configured to be slidably disposed over the valve housing and a second portion configured to be coupled to the exhaust portion, the installing including sliding the first cylindrical portion over the valve housing and coupling the second portion to the exhaust portion.

The coupling includes inserting at least one clip between the first and second portions and into the exhaust portion of the valve.

The installing further includes installing a snap ring around the at least one clip and the second portion.

The brace includes a first portion configured to be coupled to the valve housing and a second portion configured to be coupled to the exhaust portion, the installing including sliding the brace over the valve housing and rotating the brace to thereby couple the second portion to the exhaust portion.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A remanufactured solenoid valve comprising: a valve moveably coupled to a valve seat; an exhaust portion having a base and a plurality of vertical members defining a plurality of exhaust ports; a valve housing disposed over said valve seat and coupled to said exhaust portion; and a substantially cylindrical brace disposed over said valve housing and coupled to said exhaust portion, said brace configured to secure said valve housing to said exhaust portion, wherein said brace includes a pair of flanges disposed proximate said base and over at least one of said vertical members.

2. A remanufactured solenoid valve according to claim 1, wherein said brace includes a central longitudinal axis, a first portion and a second portion, said second portion including said pair of flanges, said pair of flanges spaced from said first portion and disposed against said base of said exhaust portion.

3. A remanufactured solenoid valve according to claim 2, wherein said plurality of vertical members includes a first pair of vertical members located on opposite sides of said exhaust portion and a second pair of vertical members located on opposite sides of said exhaust portion and spaced 90 degrees from said first pair of vertical members, wherein said pair of flanges are disposed over said first pair of vertical members.

4. A remanufactured solenoid valve according to claim 3, further comprising at least one clip slidably disposed between one of said pair of flanges and said first portion and extending into one of said plurality of exhaust ports.

5. A remanufactured solenoid valve according to claim 4, wherein said at least one clip includes a notch having a complementary shape to one of said second pair of vertical members, said at least one clip configured to be slidably disposed over one of said second pair of vertical members with said one of said pair of vertical members disposed in said notch.

6. A remanufactured solenoid valve according to claim 5, wherein said second portion of said brace further includes connector members extending between said pair of flanges and said first portion, said at least one clip having faces that come into contact with said connector members when said at least one clip is disposed over one of said second pair of vertical members.

7. A remanufactured solenoid valve according to claim 4, wherein said at least one clip includes a pair of clips disposed on opposite sides of said brace, said remanufactured solenoid valve further comprising a snap ring disposed around said pair of clips and said brace.

8. A remanufactured solenoid valve according to claim 2, wherein said first portion of said brace includes a plurality of fluid passageways through said brace.

9. A remanufactured solenoid valve according to claim 2, wherein said second portion is configured to receive at least one clip positioned between said first portion and said pair of flanges.

10. A remanufactured solenoid valve according to claim 9, wherein said second portion further includes a snap ring groove located between said pair of flanges and said first portion and configured to receive a snap ring for securing the at least one clip to said brace.

11. A remanufactured solenoid valve according to claim 1, wherein said valve housing has a fracture line at a location where a portion of the valve housing was broken open.

12. A remanufactured solenoid valve according to claim 1, wherein said valve seat is a replacement valve seat that was installed in the remanufactured solenoid valve to replace an original valve seat.

13. A remanufactured solenoid valve comprising: a valve moveably coupled to a valve seat; an exhaust portion having a base and a plurality of vertical members defining a plurality of exhaust ports; a valve housing disposed over said valve seat and coupled to said exhaust portion; and a substantially cylindrical brace disposed over said valve housing and coupled to said exhaust portion, said brace having a first portion and a second portion, said second portion including a pair of flanges spaced from said first portion, wherein said brace is configured to receive at least one clip positioned between said first portion and said pair of flanges.

14. A remanufactured solenoid valve according to claim 13, further comprising said at least one clip, wherein said at least one clip includes a notch having a complementary shape to one of said plurality of vertical members and is configured to be slidably disposed over one of said plurality of vertical members.

15. A remanufactured solenoid valve according to claim 14, wherein said at least one clip is configured to extend into one of said plurality of exhaust ports.

16. A remanufactured solenoid valve according to claim 13, wherein said second portion further includes a snap ring groove located between said pair of flanges and said first portion and configured to receive a snap ring for securing the at least one clip to said brace.

17. A remanufactured solenoid valve according to claim 13, wherein said first portion of said brace includes a plurality of fluid passageways through said brace.

18. A remanufactured solenoid valve comprising: a valve moveably coupled to a valve seat; an exhaust portion having a base and a plurality of vertical members defining a plurality of exhaust ports; a valve housing disposed over said valve seat and coupled to said exhaust portion; a brace disposed over said valve housing and coupled to said exhaust portion, said brace configured to secure said valve housing to said exhaust portion, wherein said brace includes a first portion and a second portion, said second portion including a pair of flanges configured and dimensioned to be disposed proximate said exhaust portion; and at least one clip slidably disposed between at least one of said flanges and said exhaust portion to thereby secure said brace to said exhaust portion.

19. A remanufactured solenoid valve according to claim 18, wherein said brace further comprises a resiliently biased locking feature configured to engage at least one of said exhaust portion vertical members or said exhaust ports.

20. A remanufactured solenoid valve according to claim 19, wherein said vertical members include protrusions, said locking feature configured to couple to one of said protrusions.

21. A remanufactured solenoid valve according to claim 19, wherein said locking features are configured to couple to said exhaust portion through rotation of said brace relative to said exhaust portion.

\* \* \* \* \*